(12) United States Patent
Halle

(10) Patent No.: US 6,669,113 B2
(45) Date of Patent: Dec. 30, 2003

(54) PLANT WATERING DEVICE

(76) Inventor: John Halle, 28972 La Carreterra, Laguna Niguel, CA (US) 92677

( * ) Notice: Subject to any disclaimer, the term of this patent is extended or adjusted under 35 U.S.C. 154(b) by 67 days.

(21) Appl. No.: 09/816,593

(22) Filed: Mar. 22, 2001

(65) Prior Publication Data

US 2002/0134860 A1 Sep. 26, 2002

(51) Int. Cl.⁷ .............................. B05B 11/02; B05B 1/30
(52) U.S. Cl. ..................... 239/320; 239/321; 239/581.2
(58) Field of Search ................................. 239/320, 321, 239/329, 569, 570, 571, 581.2, 375, 331, 350, 378, 579; 137/493.3, 493.4, 493.5

(56) References Cited

U.S. PATENT DOCUMENTS

| | | | |
|---|---|---|---|
| 1,653,562 A | 12/1927 | Grimley | |
| 3,327,904 A * | 6/1967 | Goda et al. | 222/309 |
| 3,904,116 A * | 9/1975 | Jones et al. | 239/127 |
| 4,106,392 A | 8/1978 | Johnson, Jr. et al. | 92/128 |
| 4,257,452 A | 3/1981 | Hill et al. | 137/514.7 |
| 4,269,329 A | 5/1981 | Keller | 222/333 |
| 4,621,770 A | 11/1986 | Sayen | 239/304 |
| 5,029,758 A * | 7/1991 | Chayer | 239/172 |
| 5,603,361 A | 2/1997 | Cuisinier | 141/26 |
| 5,620,314 A | 4/1997 | Worton | 417/550 |
| 5,775,595 A * | 7/1998 | Knodel et al. | 239/375 |
| 5,848,780 A | 12/1998 | Miller et al. | 251/129.21 |
| 5,927,957 A | 7/1999 | Kennedy et al. | 417/511 |
| 6,308,899 B1 * | 10/2001 | Crofford | 239/373 |
| 6,446,884 B1 * | 9/2002 | Utter et al. | 239/532 |

* cited by examiner

Primary Examiner—Davis Hwu
(74) Attorney, Agent, or Firm—Drummond & Duckworth

(57) ABSTRACT

An improved manually operated plant watering device is provided for watering plants in hard to reach places. The plant watering device includes an elongate hollow tube, flexible hose, and nozzle. Located within the hollow tube is a piston manually controlled by a handle for drawing water to within the elongate hollow tube or for projecting water from the elongate hollow tube through the flexible hose and nozzle. In a preferred embodiment, the plant watering device includes an extension pipe for extending the overall length of the plant watering device. Furthermore, preferably the plant watering device includes an impedance valve for impeding unwanted flow of water from the plant watering device.

2 Claims, 4 Drawing Sheets

PLANT WATERING DEVICE

BACKGROUND OF THE INVENTION

The present invention relates to plant watering devices. More particularly, the present invention relates to plant watering devices that provide water to plants located in hard-to-reach locations. Even more particularly, the present invention relates to plant watering devices that do not need immediate connection to a water source, or to an external power source.

To properly care for plants, it is necessary to provide water to the plant's soil and to spray the plant's leaves at periodic intervals. Many portable watering devices have been developed in an attempt to assist persons in carrying water to the plants and plant's soil. For example, "house" plant watering is normally accomplished through the use of a pitcher or similar water carrying vessel that is tilted by the user to deliver water to a plant. Unfortunately, watering pitchers are not well constructed for delivering water to hanging plants, or to plants which are situated in locations that are difficult to access. In addition, manually held pitchers are not well suited for plants which have foliage extending beyond the perimeter of the plant's container. In order to deliver water to the plant container, the user must penetrate the foliage with the pitcher, or position the pitcher directly above the plant container, and pour the water through the foliage. This process can result in plant damage, or significant spilling of water.

Additional plant watering devices have been developed which incorporate hand operated or electrically driven pumps for pumping water to plants. These systems are typically extremely complicated and expensive to manufacture. Moreover, the electrically driven watering devices require expensive batteries, or an electrical outlet to be located within the vicinity of the plants which need to be watered.

Another common method for watering plants incorporates the use of a watering hose connected to a pressurized water source such as a traditional water spigot. Unfortunately, watering hoses can be very heavy, and are limited by their lengths such that plants a distance greater than the length of the hose from a watering spigot, cannot be watered.

None of the above described watering devices are well suited for watering plants in hard-to-reach places. Moreover, none of these plant watering devices typically provide a means for measuring the amount of water to be supplied to plants.

Thus, it would be highly desirable to provide a plant watering device that supplies water to plants located in hard-to-reach places.

It would also be desirable to provide a plant watering device that can be controlled to accurately supply a desired amount of water to plants.

In addition, it would be desirable to provide a plant watering device that is portable and that does not require electrical power or direct connection to a water source.

SUMMARY OF THE INVENTION

Briefly, in accordance with the invention, I provide a plant watering device that includes an elongate hollow tube having a central cavity. The hollow tube is preferably constructed of a substantially translucent material, such as a translucent acrylic plastic or polycarbonate plastic. In addition, the hollow tube preferably includes a plurality of markings identifying volumetric measurements reflecting the amount of water located within the hollow tube. The elongate hollow tube of the present invention is at least twenty four inches long. Even more preferably, the elongate hollow tube is thirty inches long, or even significantly longer.

The elongate hollow tube includes a first end having an opening. Connected to the opening is a flexible fluid carrying hose in fluid communication with the elongate hollow tube. The flexible hose has a proximal end and distal end, with the proximal end being connected to the elongate hollow tube's opening. The portable watering device further includes a nozzle secured to the distal end of the flexible hose. Preferably, the nozzle includes an impedance valve for impeding unintentional release of water from the plant watering device.

The plant watering device also includes a piston located within the hollow tube's central cavity. The piston is connected to a handle by a rod so that manual manipulation of the handle causes the piston to slide along the length of the elongate hollow tube. Preferably, the piston includes an O-ring positioned around its periphery to form a seal with the inner sidewalls of the elongate hollow tube.

In operation, water is drawn into the elongate hollow tube by first positioning the nozzle within a freestanding water source, such as a bucket or sink full of water. The plant water device's handle is then pulled rearwardly to force the piston from the distal extremity of the hollow tube towards the hollow tube's proximal extremity. Water is thereby suctioned from the water source through the flexible hose and into the elongate hollow tube. To water plants, a person simply places the watering device's nozzle adjacent to plant soil or plant leaves and forces the plant watering device's handle, rod and piston towards the elongate tube's distal extremity. The movement of the piston forces water from the hollow tube through the flexible hose and out the nozzle. Due to the length of the hollow tube and flexibility of the hose, the nozzle can be positioned adjacent to extremely difficult to reach places.

In a preferred embodiment of the invention, the nozzle is detachable from the flexible hose so that nozzles of various constructions can be attached to the flexible hose depending on the plants that need to be watered, and the flexible hose is detachable from the elongate hollow tube so that the flexible tube may replaced. In an additional embodiment of the invention, the plant watering device further includes an extension pipe which may be attached and detached to the watering device between the elongate hollow tube and flexible hose for extending the overall length of the plant watering device.

It is an object of the present invention to provide a manually operated plant watering device that enables persons to water plants in hard-to-reach places.

It is an additional object of the present invention to provide a plant watering device that can accurately supply a desired amount of water to a plant.

These and other more specific objects and advantages of the invention would be apparent to those skilled in the art from the following detailed description taken in conjunction with the drawings.

DETAILED DESCRIPTION OF THE PREFERRED EMBODIMENTS

Figure 1:
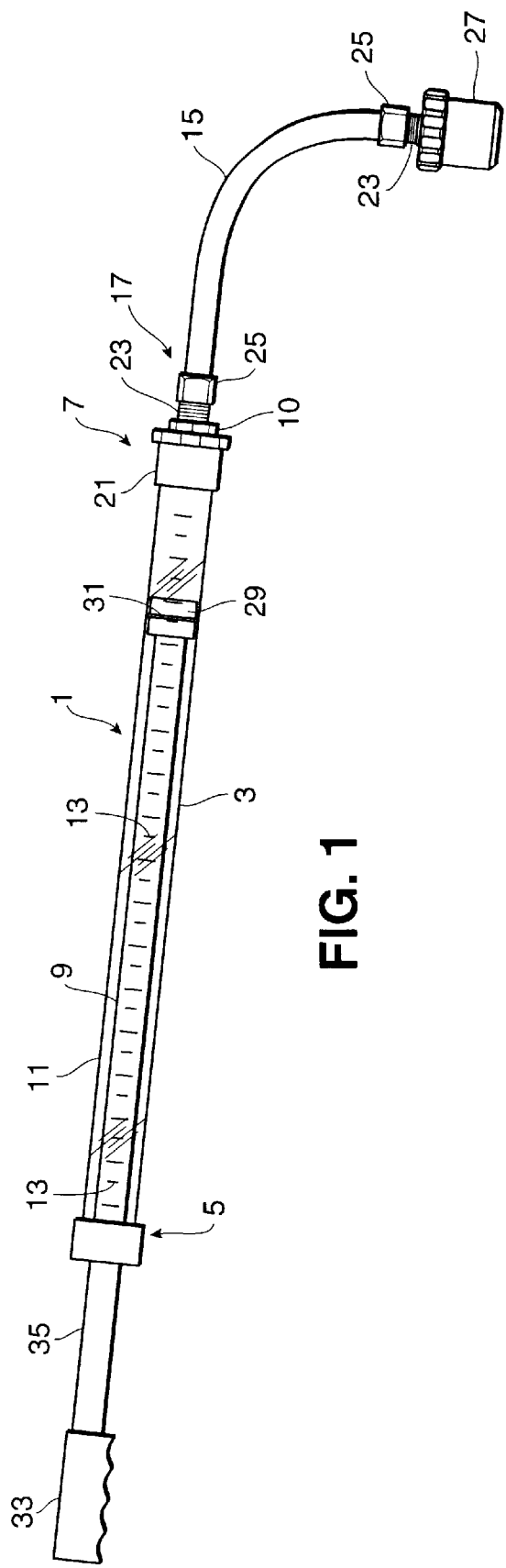
FIG. 1 is a side view of the plant watering device of the present invention.
Figure 4:
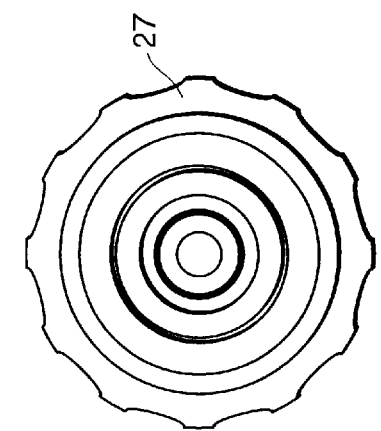
FIG. 4 is a front view of the nozzle of the plant watering device.
Figure 3:
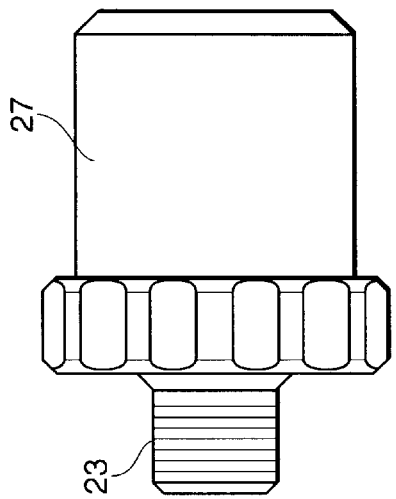
FIG. 3 is a side view of the nozzle of the plant watering device.
Figure 2:
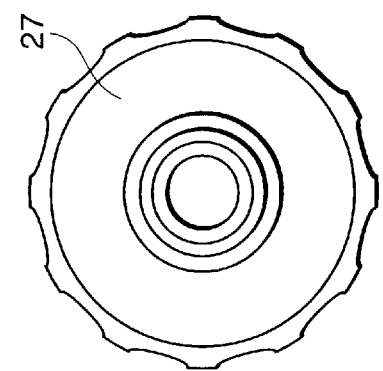
FIG. 2 is a rear view of the nozzle of the plant watering device.

While the present invention is susceptible of embodiment in various forms, as shown in the drawings, hereinafter will be described the presently preferred embodiments of the invention with the understanding that the present disclosure is to be considered as an exemplification of the invention and is not intended to limit the invention to the specific embodiments illustrated.

As shown in FIG. 1, the plant watering device 1 of the present invention includes an elongate hollow tube 3, flexible hose 15 and a nozzle 27. The elongate hollow tube 3 has a proximal end 5, distal end 7, and central cavity 9. The elongate hollow tube is preferably constructed of a translucent material and includes a plurality of gradient markings 13 along its length for indicating the amount of fluid that is located within its central cavity 9. For example, each gradient marking 13 may identify a predetermined amount of fluid. For example, each gradient marking 13 may identify five ounces of fluid within the hollow tube's central cavity. Of importance, the elongate hollow tube has significant length of at least twenty four inches. Even more preferably, the elongate hollow tube is thirty-six inches long, or even longer.

The flexible hose 15 of the plant watering device 1 is attached to the distal end 7 of the elongate hollow tube 3 and is attached so that the flexible hose 15 is in fluid communication with the hollow tube's opening 10. As shown in FIG. 1, the flexible hose is preferably attached by a threaded connection including a coupling 21 having male threads 23 projecting from the elongate hollow tube, and having female threads 25 extending from the proximal end 17 of the flexible hose 15. The threaded connection provides for the flexible hose 15 to be manually attached and detached from the elongate hollow tube 3, though other coupling means may be used that are well known to those skilled in the art.

The flexible hose 15 may be of substantially any length. In a preferred embodiment, the flexible hose is approximately ten inches long and is constructed of rubber or plastic. Moreover, preferably the flexible hose has limited plastic memory so that once it has been manually forced into a desired shape or position, it substantially maintains that desired shape or position. To reduce the flexible hose's plastic memory, in a preferred embodiment, the flexible hose 15 includes a flexible metal rod (not shown) which extends longitudinally or spirally along the length of the flexible hose. The metal rod may be located within the flexible hose's central bore or constructed within the flexible hose's sidewall.

Figure 6:
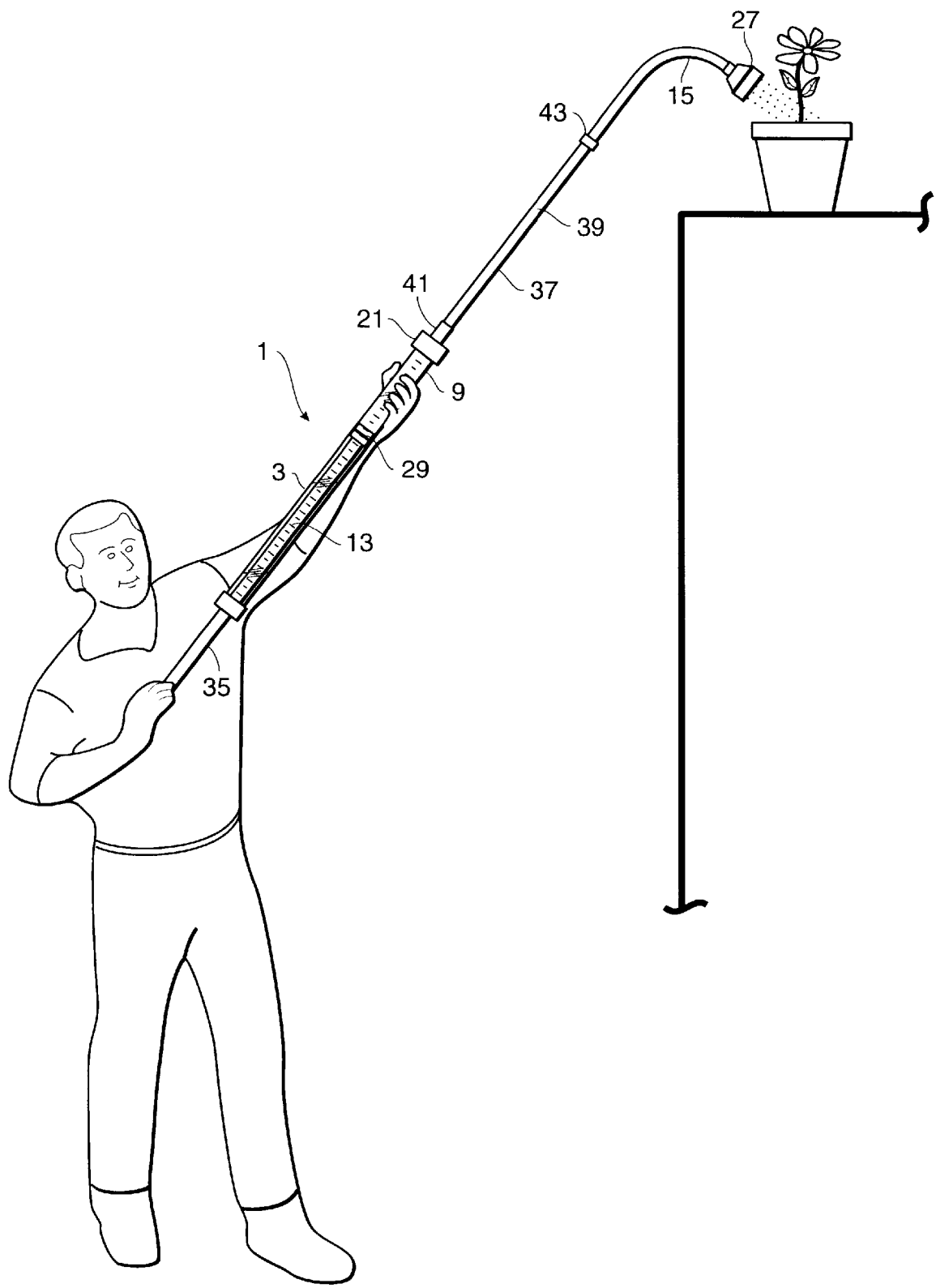

With reference to FIGS. 1 and 6, the plant watering device 1 also includes a piston 29 located within the elongate hollow tube's central cavity 9. The piston 29 is preferably sized to form a water tight seal with the elongate hollow tube's inner sidewalls 11. This seal is better accomplished with the use of an O-ring 31 attached to the piston's periphery. Attached to the piston 29 is a rod 35 and handle 33. The plant watering device is constructed so that force upon the handle 33 along the axis of the elongate hollow tube causes the piston 29 to slide within the central cavity 9 in the proximal or distal direction.

As shown in FIGS. 1–4, the nozzle 27 is also preferably threadably connected to the flexible hose 15. The nozzle may take innumerable constructions. For example, the nozzle may be constructed to provide a fine mist, a narrow stream or broad spray. Providing a detachable nozzle 27 also enables the plant watering device of the present invention to incorporate an extension pipe 37 for extending the overall length of the plant watering device. As shown in FIG. 6, the extension pipe 37 includes a central fluid carrying channel, a proximal end 41 and a distal end 43. The extension pipe is detachably connected between the elongate hollow tube 3 and flexible hose 15 for extending the overall length of the plant watering device for certain plant watering applications. For example, it is intended that the plant watering device 1 includes the extension pipe 37 when attempting to water plants in particularly high and hard-to-reach locations.

Figure 7:
FIG. 7 is a side view of the plant watering device in use for watering a Christmas tree.

With reference to FIGS. 1 and 6–7, to fill the plant watering device 1 with water, the nozzle 27 is placed within a freestanding water source such as a sink, bucket, or other container storing water. The handle 33 is pulled in the proximal direction so as to siphon water through the nozzle 27, flexible hose 15, extension pipe 37 (if attached), and into the central cavity 9 of the elongate hollow tube 3.

To water a plant using the plant watering device 1 of the present invention, a person positions the nozzle 27 adjacent to the soil or plant that is intended to be watered. For example, as shown in FIG. 6, a person holds the plant watering device so that the distal end of the elongate tube, extension pipe and flexible hose extends upwardly so that the nozzle may be positioned adjacent to potted plants in hard-to-reach places. As shown in FIG. 7, the narrow dimensions of the plant watering device also enables the device to be projected within the branches of a tree, such as a Christmas tree, for watering purposes. Once the plant watering device is properly positioned, a person forces the handle 33 and piston 29 in the distal direction, thereby forcing water located within the hollow tube's central cavity 9 through the extension pipe 37, flexible hose 15 and nozzle 27 so as to supply water to the soil or plant to be watered.

Figure 5:
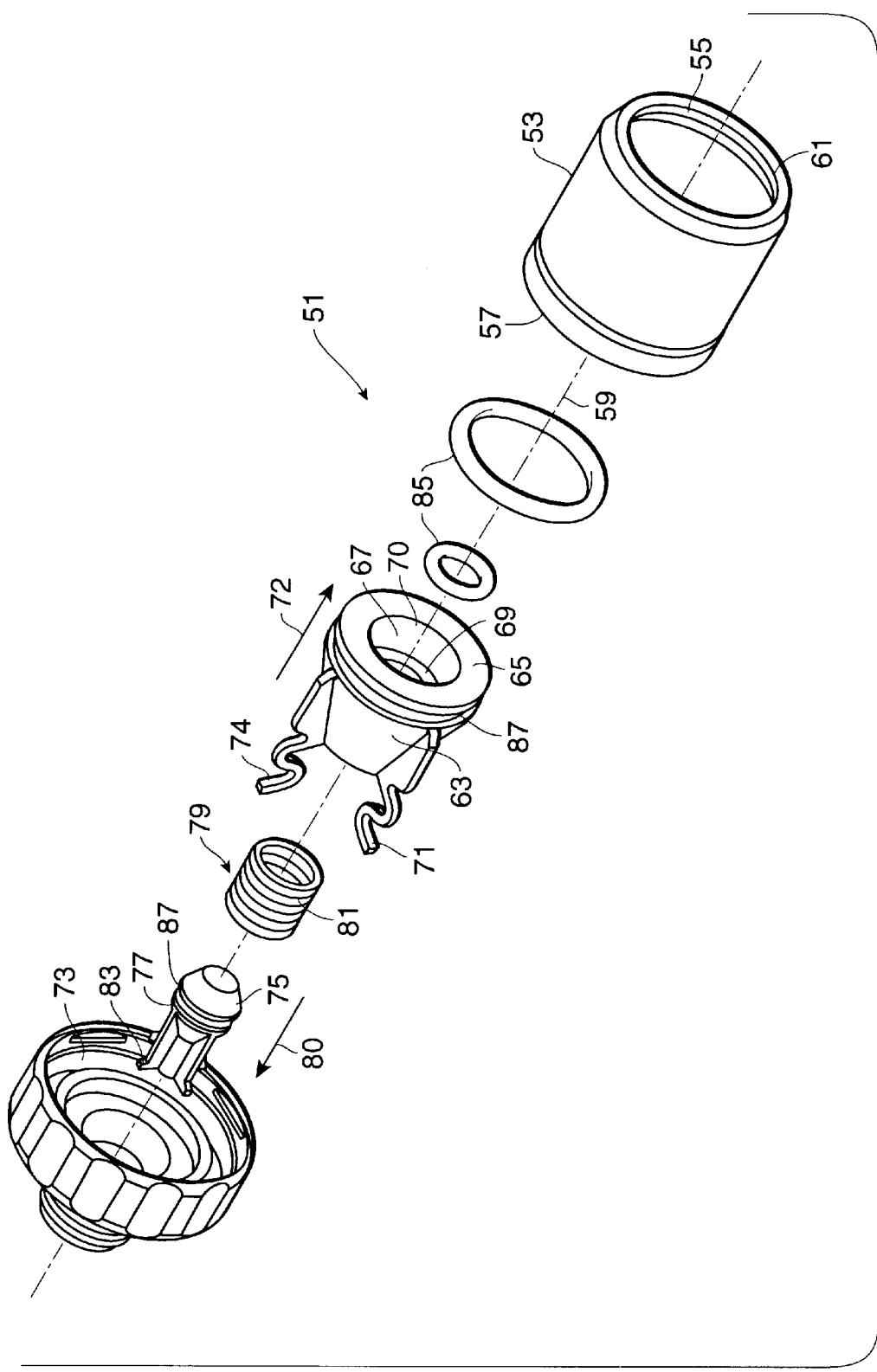
FIG. 5 is an exploded view of the nozzle of the plant watering device illustrating each of the components of the impedance valve of the present invention; and, FIG. 6 is a side view of the plant watering device incorporating an extension pipe for watering a plant in a high place.

It has been found that the above described plant watering device is prone to unwantingly drip water from the nozzle 27 when the plant watering device has been filled with water. To overcome this problem, the plant watering device preferably includes an impedance valve 51. As shown in FIG. 5, a preferred impedance valve 51 includes a conduit housing 53 which defines a conduit axis 59. The conduit housing 53 includes a first opening 55 and a second opening 57 for allowing water to flow through the conduit housing. The conduit housing 53 also includes a first radially projecting valve seat 61 located at the conduit housing's first opening 55. The impedance valve also includes a first poppit 63. The first poppit 63 includes an engagement surface 65 sized and positioned within the conduit housing so as to engage the first radially projecting valve seat 61. The first poppit 63 also includes a central bore 67 and a second valve seat 69. The first poppit 63 is biased towards the first valve seat 61 by a first biasing means 71. As shown in FIG. 5, the first biasing means preferably includes a plurality of flexible fingers 74 which engage a cap 73.

The impedance valve 51 further includes a second poppit 75. The second poppit has an engagement surface 77, and is positioned within the impedance valve so that the engagement surface 77 engages the second valve seat 69. The second poppit 75 is biased towards the second valve seat by a second biasing means 79. As shown in FIG. 5, a preferred biasing means includes a spring 81 engaging projections 83 which project from the sides of the second poppit 75. Preferably, the impedance valve includes O-rings 85 positioned within recesses 87 formed on the first and second poppit's periphery.

When assembled, the first biasing means forces the poppit in a first direction 72 so that the O-ring 85 surrounding the first poppit engages the first valve seat. Meanwhile, the second poppit is biased in a second direction 80 so that the second poppit engages the second valve seat 69. Where no forces act upon the first or second poppits, the valve remains in a closed condition, restricting the flow of water through the conduit housing 53.

With reference to FIGS. 5–7, the impedance valve 51 is preferably constructed so that the first biasing means imparts only a minimum amount of force to force the first poppit against the first valve seat. The force exerted by the first biasing means is intended to be as small as possible so that when a person fills the central cavity 9 of the elongate hollow tube, only a minimum amount of force is required by a user upon the handle 33. Meanwhile, the second biasing means is preferably constructed to exert sufficient force upon the second poppit against the second valve seat so that water within the elongate hollow tube is not inadvertently released through the impedance valve. The first and second biasing means can be constructed having appropriate spring coefficients by those skilled in the art without undue experimentation.

Having described my invention in such terms as to enable those skilled in the art to make and use it, and having identified the presently preferred embodiments thereof,

I claim:

1. A portable watering device comprising:

an elongate hollow tube having an opening for adding water, said elongate hollow tube being at least twenty four inches long;

a fluid carrying hose in fluid communication with said elongate hollow tube, said hose having a proximal end and a distal end, said proximal end being connected to said elongate hollow tube's opening, said hose capable of being positioned in an arcuate position;

a nozzle secured to the distal end of said flexible hose;

a piston within said elongate hollow tube;

a handle attached to said piston for manually controlling the movement of said piston within said elongate hollow tube for enabling the manual siphoning of water into said hollow tube through said nozzle and fluid carrying hose when said handle is forced in the proximal direction and for enabling the manual forcing of water from within said elongate hollow tube through said fluid carrying hose and through said nozzle when said handle is forced in the distal direction; and a flow valve for impeding the flow of water from said elongate hollow tube, said flow valve including: 1) a conduit housing defining an axis having first and second openings; said conduit housing including a valve seat positioned at said first opening, said valve seat including an opening to permit fluid or gas flow therethrough, 2) a poppit within said conduit housing, said poppit including a surface configured and positioned to engage said valve seat to restrict the flow of gas or fluid, and 3) a bias means for biasing said poppit toward said valve seat and for controlling the rate of flow of a gas or fluid from the portable watering device.

2. A portable watering device comprising:

an elongate hollow tube having an opening for adding water, said elongate hollow tube being at least twenty four inches long;

a fluid carrying hose in fluid communication with said elongate hollow tube, said hose having a proximal end and a distal end, said proximal end being connected to said elongate hollow tube's opening, said hose capable of being positioned in an arcuate position;

a nozzle secured to the distal end of said flexible hose;

a piston within said elongate hollow tube;

a handle attached to said piston for manually controlling the movement of said piston within said elongate hollow tube for enabling the manual siphoning of water into said hollow tube through said nozzle and fluid carrying hose when said handle is forced in the proximal direction and for enabling the manual forcing of water from within said elongate hollow tube through said fluid carrying hose and through said nozzle when said handle is forced in the distal direction;

a flow valve including: 1) a conduit housing defining an axis having first and second openings; said conduit housing including a first valve scat positioned at said first opening, said valve seat including an opening to permit fluid or gas flow therethrough, 2) a first poppit within said conduit housing, said first poppit including a surface configured and positioned to engage said first valve seat to restrict the flow of gas or fluid in a first direction but permit the flow of gas or fluid in said second direction, said first poppit further including a central bore and a second valve seat within said central bore, said second valve scat having an opening to permit gas or fluid to flow therethrough, 3) a first bias means for biasing said first poppit toward said first valve scat and for controlling the rate of flow of a gas or fluid in said second direction according to the force exerted by said first bias means, 4) a second poppit within said first poppit's central bore, said second poppit including a surface configured and positioned to engage said second valve seat to restrict the flow of a gas or fluid in said second direction but permit the flow of a gas or fluid in said second direction, and 5) a second bias means for biasing said second poppit toward said second valve scat and for controlling the rate of flow of a gas or fluid in said first direction according to the force exerted by said second bias means; and said flow valve permitting gas or fluid to flow through said conduit housing in said first direction through said cental bore at a rate controlled by said second bias means; the flow valve permitting gas or fluid to flow through said conduit housing in said second direction around the periphery of said first poppit at a rate controlled by said first bias means.

* * * * *